(No Model.)  M. JENSEN.  2 Sheets—Sheet 1.
SOLDERING MACHINE.

No. 300,083.  Patented June 10, 1884.

Witnesses:
Geo. H. Strong.
[signature]

Inventor,
M. Jensen
By Dewey & Co.
Attorneys (No Model.) 2 Sheets—Sheet 2.

M. JENSEN.
SOLDERING MACHINE.

No. 300,083. Patented June 10, 1884.

Witnesses,
Geo. H. Strong.
G. H. Nourse.

Inventor,
M. Jensen
By Dewey & Co.
Attorneys

UNITED STATES PATENT OFFICE.

MATHIAS JENSEN, OF ASTORIA, OREGON, ASSIGNOR OF TWO-THIRDS TO JOHN FOX AND ALSEY L. FOX, BOTH OF SAME PLACE.

SOLDERING-MACHINE.

SPECIFICATION forming part of Letters Patent No. 300,083, dated June 10, 1884.

Application filed March 22, 1884. (No model.)

*To all whom it may concern:*

Be it known that I, MATHIAS JENSEN, of Astoria, county of Clatsop, and State of Oregon, have invented an Improvement in Soldering-Machines; and I hereby declare the following to be a full, clear, and exact description thereof.

My invention relates to an apparatus for soldering cylindrical cans and similar articles. It consists of a circular bed, within which the solder is melted by means of a fire beneath it, a central revolving disk with arms projecting from its edge, and a mechanism by which it is revolved, so that the cans which are delivered into the spaces between the arms from a chute will be rolled around with the edge to be soldered within the melted solder in the bed or pan, and after completion will be discharged through another chute.

Figure 1:
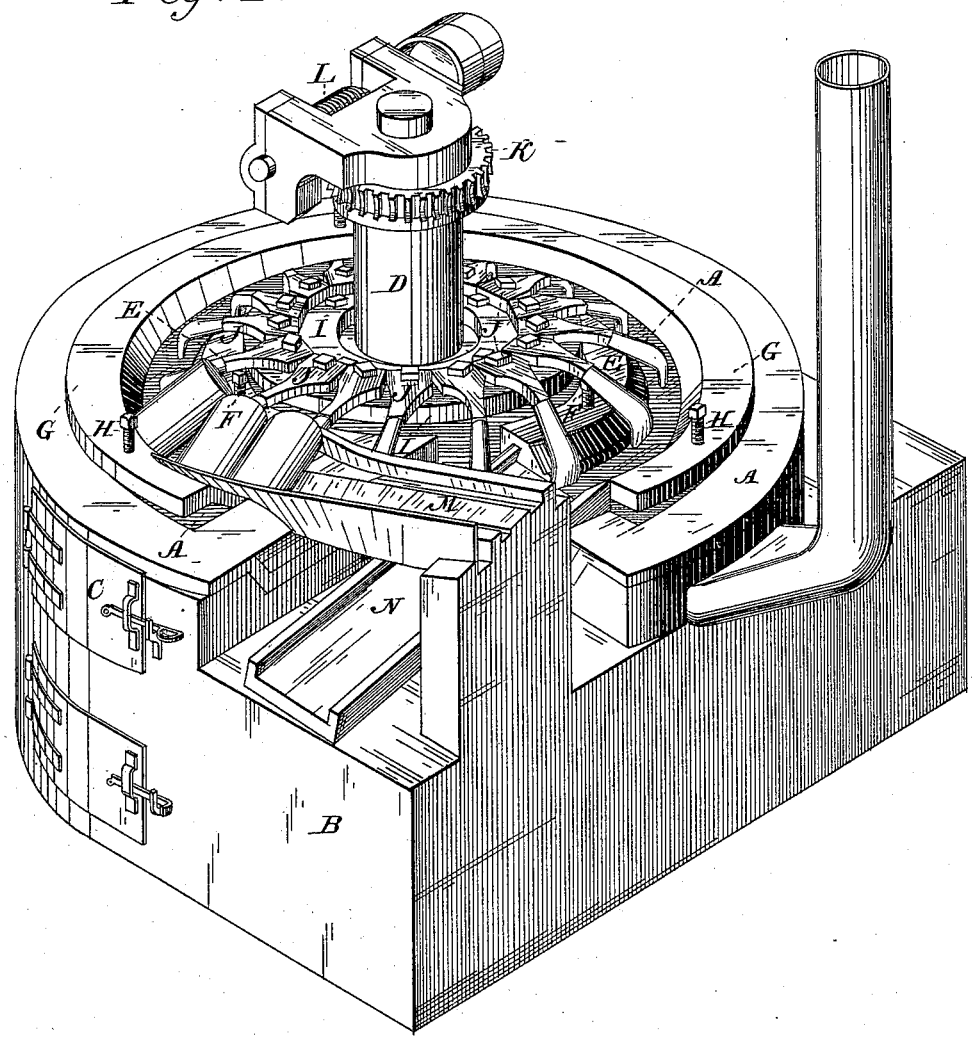
Figures 2, 3:
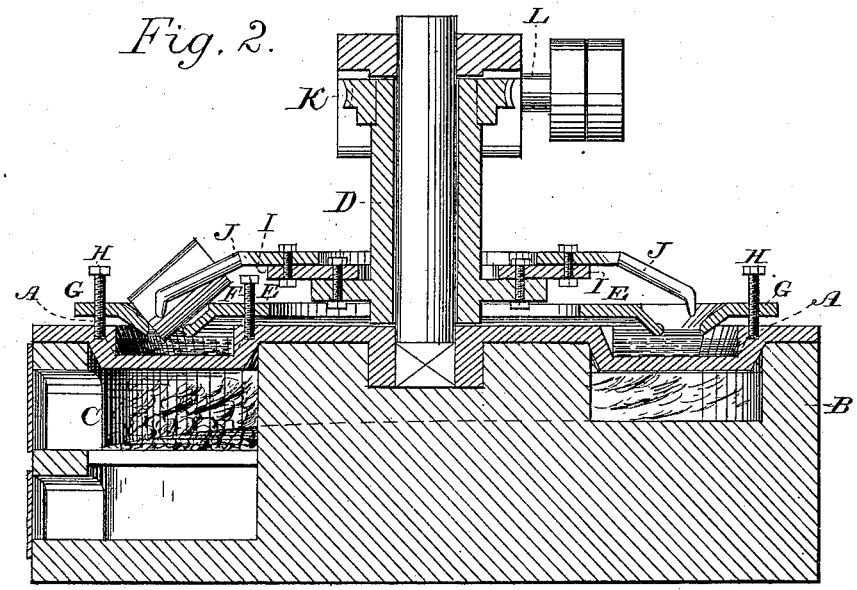

Referring to the accompanying drawings for a more complete explanation of my invention, Figure 1 is a perspective view of my soldering-machine. Fig. 2 is a vertical section. Fig. 3 is a transverse vertical section of one of the arms J.

A is a shallow circular pan or bed, which is made of cast-iron set in brick-work B, with a fire-place, C, beneath for the purpose of melting the solder which is contained in the pan. The flue from the fire-place extends around beneath the pan, and decreases in depth toward the chimney, so as to insure an even heat throughout. The pan consists of a circular channel between the outer rim, and an inner rim or disk of considerable diameter, which surrounds the central post or spindle, D. The pan forms about three-fourths of a circle, the ends being closed and the open space or quadrant being occupied by the feed and discharge chutes, by which the cans are admitted to and led out of the machine. A circular flange, E, is supported upon the inner rim of the pan with screws F, by which it may be raised or lowered, and a similar flange or ring, G, is supported upon the outer rim with adjusting-screws H. These rings both have surfaces inclined downward toward the solder-pan A, toward the center of which they project. The inclined surface of the inner ring serves as a support upon which the sides of the cans roll, and the base of the can rests against the inclined side of the outer flange, G, as shown. This allows the angle formed by the side and bottom of the can to dip in the solder as the can rolls around, and it will thus be sealed before the can is discharged. By raising or lowering the rings E and G by their adjusting-screws the depth to which they dip into the solder will be regulated.

Around the central spindle, D, is fitted a hub having a circular flange, I, projecting outward from its lower part above the ring E, and this flange has arms J bolted or otherwise secured to it, and extending outward and downward above the inclined surface of the inner ring, E, to act as drivers to roll the cans around the circle and at the same time to keep them separated from each other. The flange may be bolted on in two parts, so as to be easily removed and replaced by others of different sizes, to adapt the carriers to cans of different sizes. The arms J are made oval or rounded upon the top, so that as the cans are delivered from the chute to the machine they will fall between the arms and will not lodge upon the top of the arms. The front edges of the arms are not in lines radial to the center; but the outer ends are in advance of a radial line passing through the inner ends, so that the arms are tangential to a small central circle. By this arrangement the cans are caused to roll around the circle without hitch.

The upper end of the hub or sleeve from which the flange I projects has a worm-wheel, K, secured to it, and a screw, L, engages the wheel. This screw has a pulley, crank, or other device upon its shaft, through which power may be applied to rotate it and drive the can-moving arms. The cans are delivered into the channel between the carrying-arms by a chute, M, into which they pass after being prepared for soldering. The cans roll down the inclined chute, which has its lower end formed with such a cant or inclination as to deliver the cans to the soldering-channel at the proper angle, so that the arms J may each take a can and carry it around the circle to the inclined chute N. The cans are delivered into this chute by the arms J, and will roll down to any desired point, ready for the next operation.

Having thus described my invention, what I claim as new, and desire to secure by Letters Patent, is—

1. An apparatus for soldering cans or cylinders, consisting of a circular trough for containing solder, with a fire-place and flue beneath, and an angular support upon which the cans roll, with their angles dipping in the solder, in combination with a central disk with arms projecting outward, to roll the cans around, substantially as herein described.

2. In a soldering apparatus, a circular solder-trough with fire-place beneath, and arms driven by a central flange, by which the cans are rolled around the circle, in combination with exterior and interior rings having angular faces upon which the cans roll and by which the angle to be soldered is caused to dip into the solder, substantially as herein described.

3. In a soldering apparatus, the circular solder-trough, fire-place, and can-propelling arms, in combination with exterior and interior rings with inclined faces upon which the cans roll, and adjusting-screws by which the rings may be raised or lowered, substantially as herein described.

4. In a soldering apparatus, a circular solder trough or pan, fire-place, and can supporting and adjusting rings, in combination with removable central disks having arms projecting from the periphery to drive the cans, whereby different-sized cans may be soldered, substantially as herein described.

5. In a soldering apparatus, a circular solder trough or pan, fire-place, and can supporting and adjusting rings, in combination with a central disk with projecting arms, and a worm-gear, pulley, or other driving mechanism by which it is rotated, substantially as herein described.

6. In a soldering apparatus, a circular solder trough or pan, fire-place, and can-supporting rings, and a central rotating disk with arms projecting so as to drive the cans, in combination with an inclined chute to deliver the cans into the channel, said chute having its lower end inclined or canted, so as to deliver the cans at the proper angle, substantially as herein described.

7. In a soldering apparatus, a circular solder trough or pan with fire-place, can-supporting rings, and central rotating disk with arms projecting so as to move the cans around, and inclined chute by which the cans are delivered into the trough, in combination with a second inclined chute leading downward from the delivery-point of the apparatus, substantially as herein described.

8. In a soldering apparatus, a circular trough or pan for containing solder, and means for supporting the cans at the proper angle and rolling them around the circle, in combination with a fire-place beneath the pan having a circular flue extending around beneath the pan to the chimney, and tapering or decreasing in size from the fire-place to the chimney, substantially as herein described.

In witness whereof I have hereunto set my hand.

MATHIAS JENSEN.

Witnesses:
C. W. FULTON,
ALSEY L. FOX.